United States Patent
Caldwell (10) Patent No.: US 9,576,318 B2
(45) Date of Patent: Feb. 21, 2017

(54) AUTOMATIC PAYMENT AND DEPOSIT MIGRATION

(71) Applicant: MX TECHNOLOGIES, INC., Lehi, UT (US)

(72) Inventor: John Ryan Caldwell, Provo, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 0 days.

(21) Appl. No.: 14/036,957

(22) Filed: Sep. 25, 2013

(65) Prior Publication Data

US 2014/0095389 A1    Apr. 3, 2014

Related U.S. Application Data (60) Provisional application No. 61/744,398, filed on Sep. 25, 2012.

(51) Int. Cl.
| | |
|---|---|
| G06Q 40/00 | (2012.01) |
| G06Q 20/10 | (2012.01) |
| G06Q 40/02 | (2012.01) |
| G06Q 20/14 | (2012.01) |
| G06F 17/30 | (2006.01) |

(52) U.S. Cl.
CPC ......... *G06Q 40/00* (2013.01); *G06F 17/30542* (2013.01); *G06F 17/30554* (2013.01); *G06F 17/30867* (2013.01); *G06Q 20/10* (2013.01); *G06Q 20/14* (2013.01); *G06Q 40/02* (2013.01)

(58) Field of Classification Search
None
See application file for complete search history.

(56) References Cited

U.S. PATENT DOCUMENTS

| | | |
|---|---|---|
| 7,185,104 B1 | 2/2007 | Thorup et al. |
| 7,266,602 B2 | 9/2007 | Givoly |
| 7,546,945 B1 * | 6/2009 | Bucci ............... G06Q 20/10 235/379 |
| 7,792,717 B1 | 9/2010 | Hankins et al. |
| 8,001,040 B2 | 8/2011 | Keithley |
| 8,051,017 B2 | 11/2011 | Munson et al. |
| 8,086,528 B2 | 12/2011 | Barrett et al. |
| 8,447,025 B2 | 5/2013 | Shaffer |
| 8,458,064 B1 | 6/2013 | Dobbins |
| 8,924,288 B1 * | 12/2014 | Easley ............... G06Q 40/02 705/35 |
| 2003/0055723 A1 | 3/2003 | English |
| 2003/0130916 A1 | 7/2003 | Block |
| 2005/0234824 A1 | 10/2005 | Gill et al. |
| 2006/0116949 A1 | 6/2006 | Wehunt |
| 2007/0100748 A1 | 5/2007 | Dheer |
| 2010/0100470 A1 * | 4/2010 | Buchanan ............ G06Q 10/10 705/35 |

(Continued)

OTHER PUBLICATIONS

Non-Final Rejection mailed Dec. 3, 2015 in U.S. Appl. No. 14/036,951.

(Continued)

*Primary Examiner* — Robert R Niquette
*Assistant Examiner* — Joseph W King
(74) *Attorney, Agent, or Firm* — Kunzler Law Group, PC (57) ABSTRACT

The disclosure extends to methods, systems, and computer program products for migrating automatic financial services from one institution to another institution with minimum user input required.

22 Claims, 5 Drawing Sheets

(56) References Cited

U.S. PATENT DOCUMENTS

| | | | |
|---|---|---|---|
| 2010/0250416 A1* | 9/2010 | Hazlehurst | 705/34 |
| 2011/0107265 A1* | 5/2011 | Buchanan | G06Q 30/02 |
| | | | 715/835 |
| 2011/0238620 A1 | 9/2011 | Ramineni | |
| 2011/0276414 A1* | 11/2011 | Subbarao et al. | 705/14.73 |
| 2012/0054095 A1 | 3/2012 | Lesandro et al. | |
| 2013/0046661 A1 | 2/2013 | Levin | |
| 2014/0344029 A1 | 11/2014 | Caldwell | |
| 2016/0217440 A1 | 7/2016 | Caldwell | |

OTHER PUBLICATIONS

Non Final Rejection mailed Dec. 3, 2014 in U.S. Appl. No. 13/986,538.
Final Rejection mailed Jun. 16, 2015 in U.S. Appl. No. 13/986,538.
Mary Knobloch, "Banks Community interest pays for all: Bank takes community into account", Mar. 31, 1976, Chicago Tribune.
U.S. Appl No. 14/971,717 Non-Final Rejection mailed Jun. 3, 2016.

* cited by examiner

AUTOMATIC PAYMENT AND DEPOSIT MIGRATION

CROSS-REFERENCE TO RELATED APPLICATIONS

This application claims the benefit of U.S. Provisional Application No. 61/744,398, filed Sep. 25, 2012, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

BACKGROUND

Automatic payments and deposits have been facilitated by financial institutions, entities, payees, and employers for the convenience of all involved. Another benefit for financial service providers is that by facilitating automatic payments and deposits they increase the number of interactions with their customers. The increased interaction between the financial institution and its customers creates a dependent relationship, at least in part, because setting up automatic payments and automatic deposits is time consuming and difficult to change. Accordingly, many customers and patrons are deterred from changing financial institutions because of the difficulty in changing automated services, such as direct deposit or bill payments. Additionally, financial institutions that provide superior customer service or the like may experience difficulty in attracting new customers because many of the customers already have existing automatic services, such as direct deposit or bill payments, with financial institutions that may provide inferior customer service or the like.

The disclosure relates generally to automatic financial services and relates more particularly, but not necessarily entirely, to a system for automating the switching of automatic financial services from a first institution to a second institution with minimal user input.

The features and advantages of the disclosure will be set forth in the description which follows, and in part will be apparent from the description, or may be learned by the practice of the disclosure without undue experimentation. The features and advantages of the disclosure may be realized and obtained by means of computing systems, networks, and combinations of firmware, software and hardware, particularly disclosed and enumerated in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

The disclosure extends to methods, systems, and computer based products that automate the switching of automatic financial services between financial institutions with minimal required user actions. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

Automatic services, such as payments (bill-pay) and deposits (direct deposit), are important services that financial institutions provide to their customers. For simplicity and clarity, the automatic service of bill payments will be primarily used in the embodiments of the disclosure for purposes of streamlining the disclosure. However, it will be appreciated that the advantages and features disclosed herein also apply equally to the automatic deposit services. The automatic services provided by a financial institution are so important, in some cases, that customers will often select a financial institution and stay with a financial institution because of that financial institution's automated services, such as bill-pay and direct deposit, and that factor is often chosen or selected over many other factors. A common problem related to automated services, such as bill-pay or direct deposit, is that the automated data may be stored by a third party bill-pay provider and not necessarily by the financial institution. Accordingly, systems and methods will be disclosed herein for automating the switching or changing automatic financial services from one institution to another.

Figure 1:
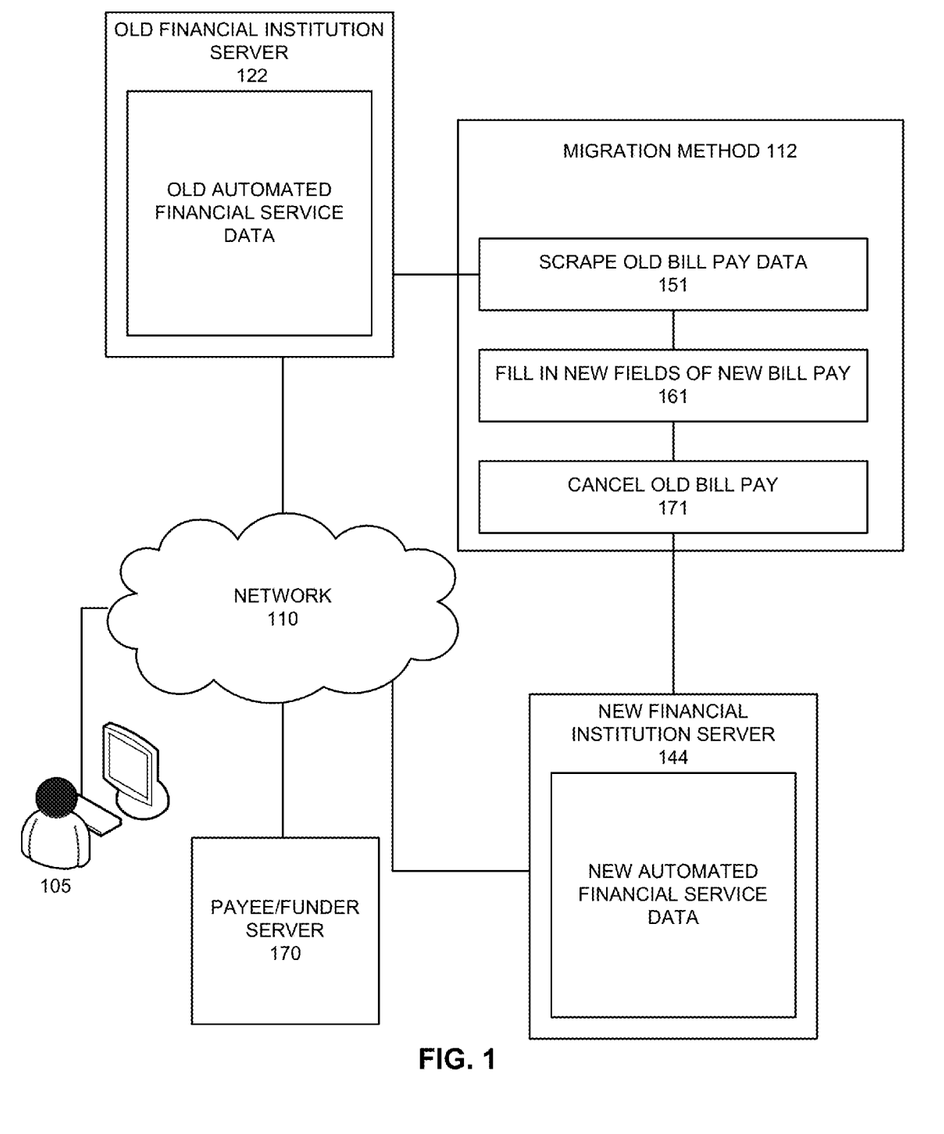
FIG. 1 illustrates a computer environment and network for providing automatic switching of automatic financial service providers in accordance with the principles and teachings of the disclosure.

FIG. 1 illustrates a computer environment and network for providing automatic switching of automatic financial service providers. Illustrated in the figure is a user 105 that is electronically connected to financial institutions through a network 110. The financial institutions may comprise an old financial institution having a server 122 and a new financial institution having a server 144. The old financial institution server 122 may comprise old automated financial service data that may be used to facilitate automatic payment services and automatic deposit services. The new financial institution server 144 may comprise new automated financial service data that may be used to facilitate automatic payment services and automatic deposit services on behalf of the clients of the new financial institution.

A method 112 for migrating automated financial services from the old institution to the new institution is illustrated in FIG. 1. An implementation of the migration method 112 may comprise a scraping process at 151 that scrapes old bill pay or direct deposit data, an auto fill process at 161, and canceling process at 171. The scraping process at 151 may include electronically scraping account data from an online user interface of the old financial institution server 122 in a human-displayable format, rebuilding the account data into a computer-readable standard data exchange API format such as an MX Data Exchange (MDX) API format, an Open Financial Exchange (OFX) API format, a Credit Union Financial Exchange (CUFX) API format, and others, and storing the rebuilt account data as aggregated account data. The method 112 may be enabled by computer readable instructions stored in the memory of the computing environment. The method 112 may be provided from a payee and/or funder server 170, or may be provided from a terminal of the user 105.

Figure 2:
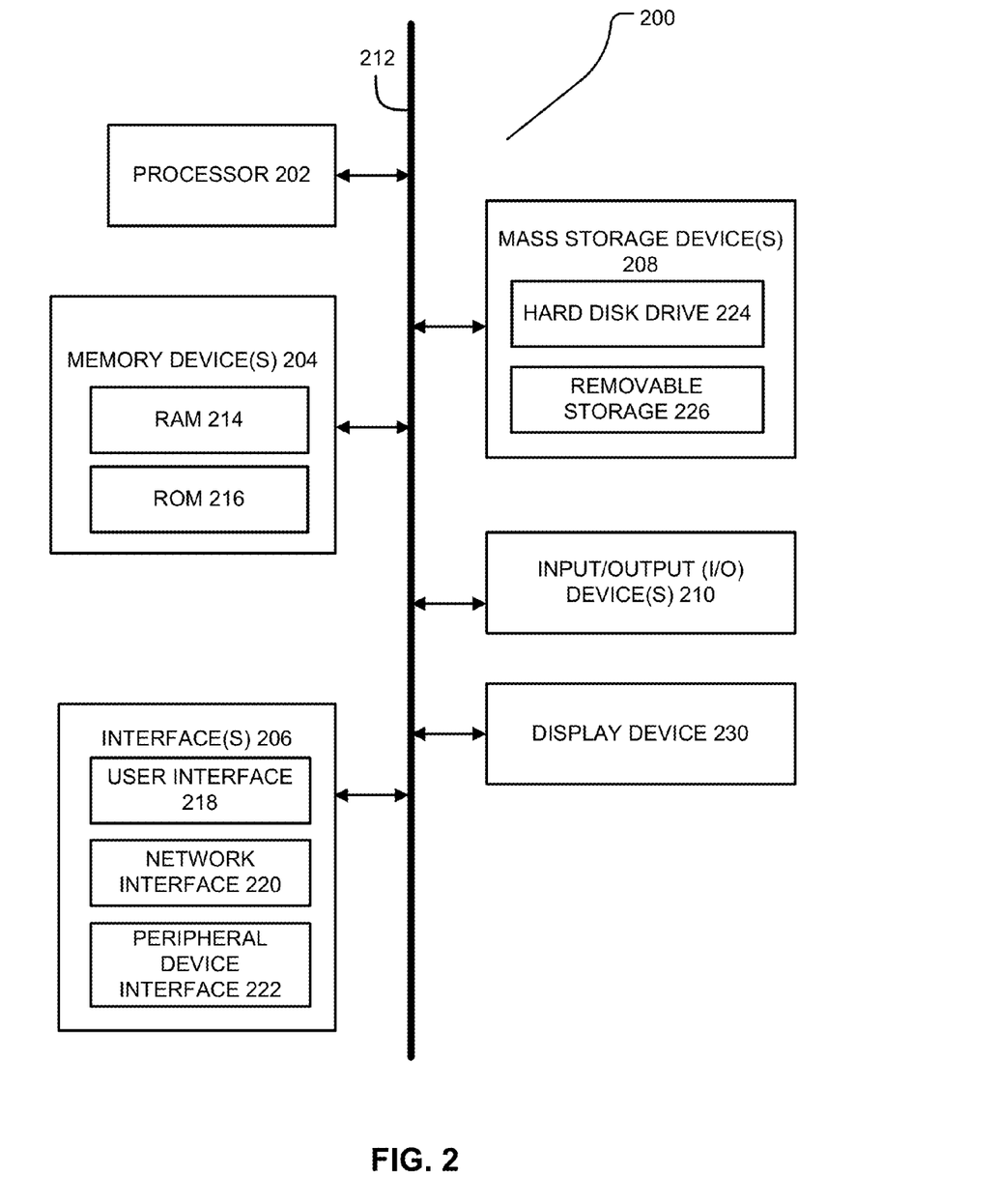
FIG. 2 illustrates a schematic representation of computer hardware and protocols that enable the various embodiments discussed herein in accordance with the principles and teachings of the disclosure.

FIG. 2 illustrates a schematic representation of computer hardware and protocols that enable the various embodiments discussed herein. Implementations of the disclosure may comprise or utilize a special purpose or general-purpose computer, including computer hardware, such as, for example, one or more processors and system memory, as discussed in greater detail below. Implementations within the scope of the disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. It will be appreciated that certain terms are used throughout the description and claims to refer to particular system components. As one skilled in the art will appreciate, components may be referred to by different names. This document does not intend to distinguish between components that differ in name, but not function.

Illustrated in FIG. 2 is a block diagram illustrating an example computing device 200. Computing device 200 may be used to perform various procedures, such as those discussed herein. Computing device 200 can function as a server, a client, or any other computing entity. Computing device 200 can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in the figure, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include digital cursor control devices, keyboards, keypads, microphones, monitors or other display devices, speakers, printers, network interface cards, modems, and the like.

Display device 230 includes any type of device capable of displaying information to one or more users of computing device 200. Examples of display device 580 include a monitor, display terminal, video projection device, and the like.

Interface(s) 206 include various interfaces that allow computing device 200 to interact with other systems, devices, or computing environments. Example interface(s) 206 may include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Figure 3:
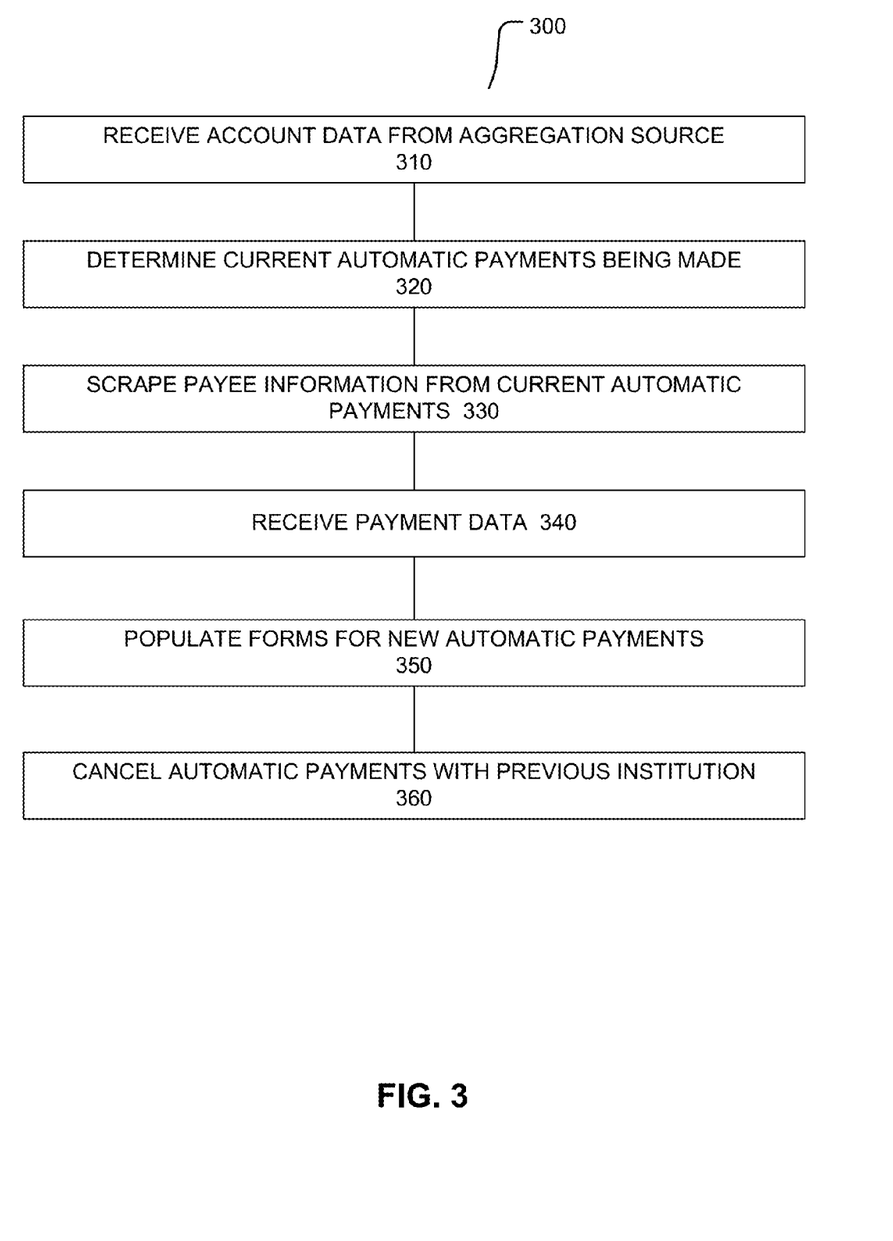
FIG. 3 illustrates a method for providing automated migration of automated financial services from an old provider to a new provider within a computing environment in accordance with the principles and teachings of the disclosure.

Referring now to FIG. 3, there is illustrated a method for providing automated migration of automated financial services from an old provider to a new provider within a computing environment. For example, if a financial institution wishes to switch to a new bill-pay provider, it may lose historical data and the users/customers may need to enter all of their bill-pay information again (accounts, payees, funders, etc.). This can cause major disruption for users and many of them will leave a financial institution in such an instance. Therefore, from a financial institution's point of view, a method is needed to support financial institutions (and its users) when changing bill-pay providers without disruption to customers or prohibitive fees being charged by the bill-pay provider to migrate or allow access to bill-pay data. Accordingly, at 310 of migration method 300 account data may be received from an aggregation source and stored in computer memory. The account data may comprise transaction data associate with user accounts such as; automatic bill pay, automatic deposit, payee information, amount information, etc.

At 320, current automated services may be determined. The determinations may be made by any known computer method such as, for example, pattern recognition, string matching, data tags, meta data, and the like.

At 330, once the automated services have been identified, payee and payment information may be scraped from the automated services transactions. For example, an implementation may comprise the process of scraping bill-pay information from the bill-pay provider's online interfaces, or use an aggregation source to gather bill-pay information. Existing bill-pay can often be scraped, gathered by aggregators or the like. This will allow an entity to capture some or all of the data that the user has in their current bill-pay setup.

At 340, the scraped payment data may be received by the new financial institution and stored in memory for use in setting up new automatic financial services. For example, when the need for switching bill-pay providers arises, potentially all of that information, including historical information, as far back as the scrape, aggregators or other sources exist, will be available immediately and will be reconstructed using the gathered data (and potentially additional user input at some steps of the migration). This permits switching bill-pay providers without the users needing to set up all of their bill-pay from scratch.

At 350, forms associated with new automatic financial services may be populated with the payment data received and stored during process 340.

At 360, old automatic financial service may be cancelled with the old provider in order to prevent double payments and deposits.

Figure 4:
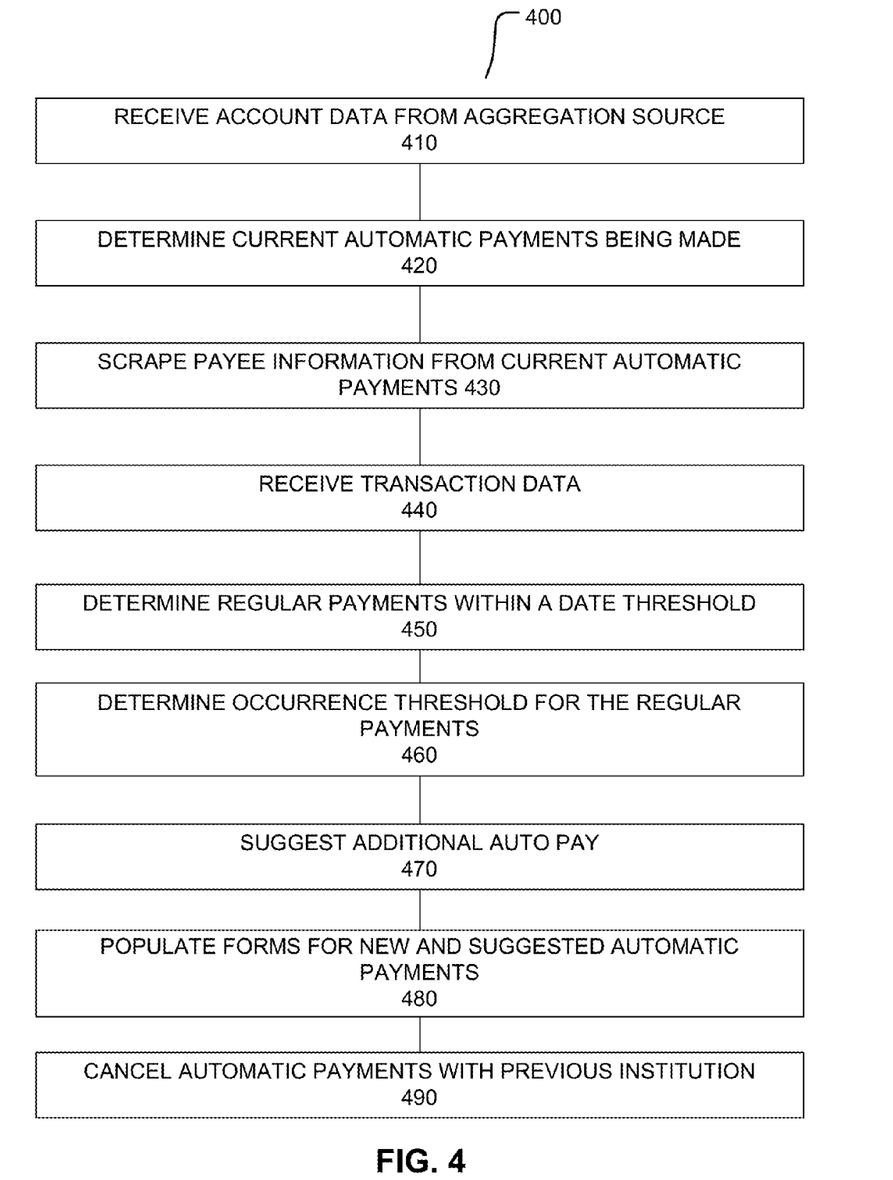
FIG. 4 illustrates a method for providing automated migration of automated financial services from an old provider to a new provider with the additional functionality of suggesting additional automated financial services in accordance with the principles and teachings of the disclosure.

Referring now to FIG. 4, there is illustrated a method for providing automated migration of automated financial services from an old provider to a new provider with the additional functionality of suggesting additional automatic financial services. For example, an aggregation of financial transactions may comprise a plurality of recurring payments and deposits that have yet to be automated by a financial services provider. In such an instance, a method for identifying these transactions and suggesting automatic services is needed. Accordingly, at 410 of migration method 400 account data may be received from an aggregation source and stored in computer memory. The account data may comprise transaction data associate with user accounts, such as automatic bill-pay, automatic deposit, payee information, amount information, etc. It will be appreciated that a request to transfer or migrate at least one set of automated account data, such as bill-pay or direct deposit data, from one financial institution to another may come directly from an end-user, or such a request may come from a financial institution without departing from the scope of the disclosure. Additionally, the account data may comprise recurring payments and deposits that could be automated, but may or may not be set up into an automated payment or deposit system.

At 420, current automated services may be determined. The determinations may be made by any known computer method such as, for example, pattern recognition, string matching, data tags, meta data, and the like.

At 430, once the automated services have been identified, payee and payment information may be scraped from the automated services transactions. For example, an implementation may comprise the process of scraping bill-pay information from the bill-pay provider's online interfaces, or use an aggregation source to gather bill-pay information. Existing bill-pay can often be scraped, gathered by aggregators or the like. This will allow an entity to capture some or all of the data that the user has in their current bill-pay setup.

At 440, the scraped payment data may be received by the new financial institution and stored in memory for use in setting up new automatic financial services. For example, when the need for switching bill-pay providers arises, potentially all of that information, including historical information, as far back as the scrape, aggregators or other sources exist, will be available immediately and will be reconstructed using the gathered data (and potentially additional user input at some steps of the migration). This permits switching bill-pay providers without the users needing to set up all of their bill-pay from scratch.

At 450, the system may identify recurring payments and deposits that are being made on a regular basis. In an implementation a threshold may be established for identifying what qualifies as a recurring financial service. For example, a payment that happens every month around the same day of the month may be determined to be recurring. In the present example, a date range may be used as a threshold for determining recurrence.

At 460, an occurrence threshold may be determined. An occurrence threshold may determine that a certain transaction must be repeated at least a predetermined number of times to be considered recurring.

At 470, the method may suggest to the user the additional financial services that may be automated.

At 480, new forms associated with the new and suggested automatic financial services may be populated with the payment data received and stored during process 440.

At 490, old automatic financial service may be cancelled with the old provider in order to prevent double payments and deposits.

An implementation of a method for migrating automatic bill payments from a first financial institution to a second financial institution over a network of computers may comprise receiving a request from a user for migrating current automatic bill payments from a first financial institution to a second financial institution; receiving a request from a user for aggregated account data; retrieving from an aggregation source the desired aggregated account data comprising transaction data; determining automatic payments currently being made by the first financial institution; scraping payment information for each of the automatic payments currently being made by the first financially and storing the payee information in computer memory; scraping payee information for each of the automatic payments currently being made by the first financially and storing the payee information in computer memory; retrieving new automatic payment forms from the second financial institution and populating the new automatic payment forms with the payee and payment information retrieved from computer memory; and canceling the current automatic payments with the first financial institution.

Figure 5:
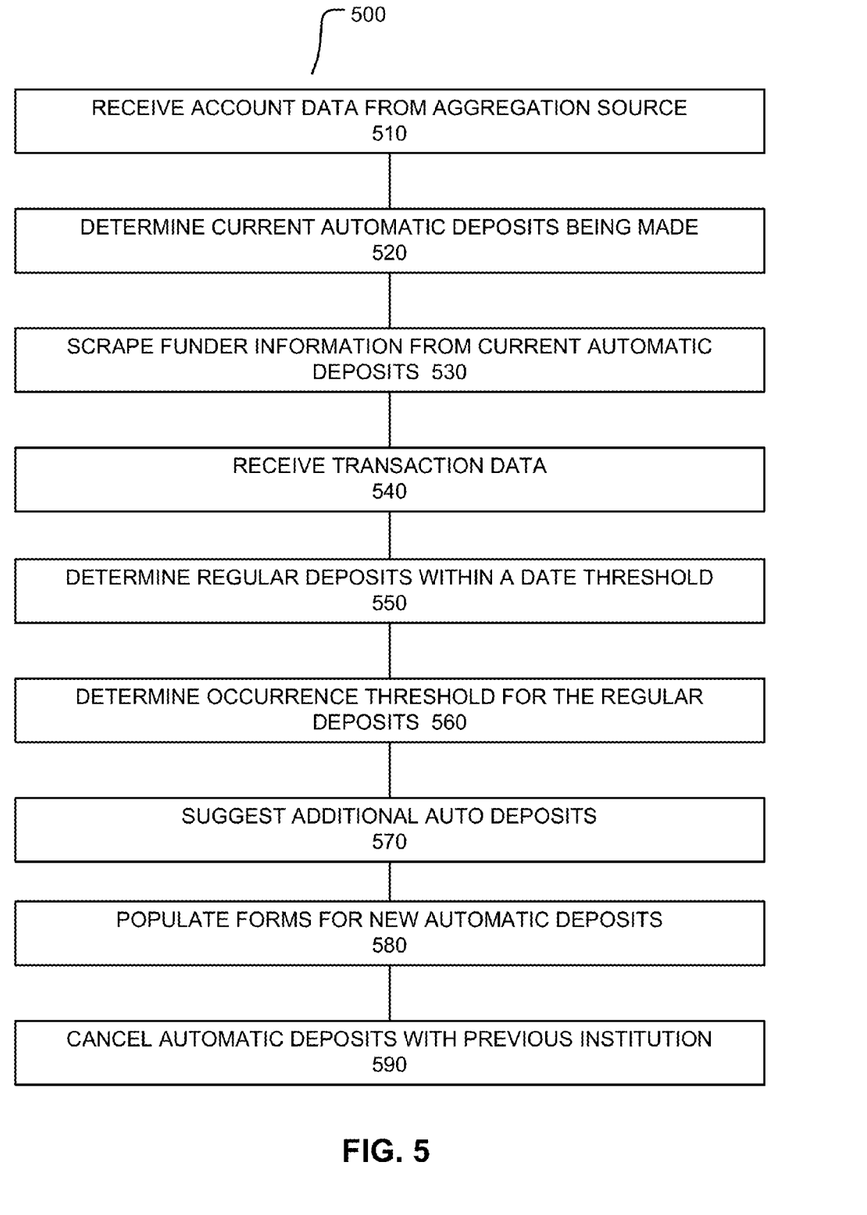
FIG. 5 illustrates a method for migrating automatic deposits from one financial institution to another financial institution and the feature of suggesting additional automatic deposit services for recurring transactions in accordance with the principles and teachings of the disclosure.

FIG. 5 illustrates a method for migrating automatic deposits from one financial institution to another financial institution and the feature of suggesting additional automatic deposit services for recurring transactions. It will be appreciated that a request to transfer or migrate at least one set of automated direct deposit data from one financial institution to another may come directly from an end-user, or such a request may come from a financial institution without departing from the scope of the disclosure.

At 510 of migration method 500, account data may be received from an aggregation source and stored in computer memory. The account data may comprise deposit transaction data associated with user accounts. Additionally, the account data may comprise recurring deposits that could be automated for additional convenience for the user.

At 520, current automated deposit services may be determined. The determinations may be made by any known computer method such as, for example, pattern recognition, string matching, data tags, meta data, and the like.

At 530, once the automated services have been identified, funder and funding information may be scraped from the automated services transactions. For example, an implementation may comprise the process of scraping direct deposit information from the funding provider's online interfaces, or use an aggregation source to gather direct deposit information. Existing direct deposits can often be scraped, gathered by aggregators or the like. This will allow an entity to capture some or all of the data that the user has in their current direct deposit setup.

At 540, the scraped deposit data may be received by the new financial institution and stored in memory for use in setting up new automatic deposit services. For example, when the need for switching direct deposit providers arises, potentially all of that scraped information, including historical information, as far back as the scrape, aggregators or other sources exist, will be available immediately and will be reconstructed using the gathered data (and potentially additional user input at some steps of the migration). This permits the switching of funding providers without the users needing to set up all of their direct deposits from scratch.

At 550, the system may identify deposits that are being made on a regular basis. In an implementation a threshold may be established for identifying what qualifies as a recurring financial service. For example, a deposit that is made manually every month around the same day of the month or a deposit that is about the same amount every month may be determined to be recurring. In the present example, a date range may be used as a threshold for determining recurrence.

At 560, an occurrence threshold may be determined. An occurrence threshold may determine that a certain transaction must be repeated at least a predetermined number of times to be considered recurring.

At 570, the method may suggest to the user the additional deposit services that may be automated.

At 580, new forms associated with the new and suggested automatic financial services may be populated with the deposit data received and stored during process at 540.

At 590, old automatic financial services may be cancelled with the old provider in order to prevent erroneous deposits and deposit expectations.

An implementation may provide a method for migrating automatic deposit from a first financial institution to a second financial institution over a network of computers and may comprise receiving request from a user for migrating current automatic deposit from a first financial institution to a second financial institution; receiving a request from a user for aggregated account data; retrieving from an aggregation source the desired aggregated account data comprising transaction data; determining automatic deposits currently being made by the first financial institution; scraping deposits information for each of the automatic deposits currently being made by the first financially and storing funder information in computer memory; scraping funder information for each of the automatic deposits currently being made by the first financially and storing the funder information in computer memory; retrieving new automatic deposit forms from the second financial institution and populating the new automatic deposit forms with the funder and deposit information retrieved from computer memory; and canceling the current automatic deposits with the first financial institution.

Additionally, an implementation may automatically set up the accounts and payments based on the gathered data or data acquired from any third party source. There may be some data missed by the source, such as some partial account numbers or other data and the system can prompt the user for the missing information. Because most of the data may be auto filled, users are re-entering much smaller amounts of data and the migration is much less timely and possibly even painless to the end-user, thereby facilitating an easy and successful migration with minimal inconvenience.

An implementation may use a scrape method to gather (or acquire) the desired information and automatically set up (or partially set up) bill-pay with a new bill-pay provider.

An implementation may further comprising reformatting the request to be compatible with the aggregation source; sending the reformatted request to the aggregation source over the network of computers; receiving requested data from the aggregation source over the network of computers; and presenting the aggregated account data to the user.

An implementation may further comprise determining if the payment amount is static and storing the payment amount in computer memory.

An implementation may further comprise searching transaction data for recurring payments that are not automatic and scraping the recurring payments for payee information and storing the payee information in computer memory.

An implementation may further comprise retrieving the payee information from computer memory and presenting the payee information to a user with a suggestion of converting the recurring payments to automatic payments made by the second financial institution.

An implementation may further comprise determining a recurrence threshold based in time between payments to the same payee.

An implementation may further comprise determining a recurrence threshold based on number of times payee is represented within the transaction data.

An implementation may comprise requests from the user that comprises login information for granting access to auto payment controls.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, "user" is intended to denote a person or entity that is utilizing the methods and the systems disclosed herein.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method, comprising:

receiving, by a third-party outsource provider server, a request via a computer network from a user for electronically migrating current automatic electronic financial services comprising automatic payments from a first financial institution's servers to a second financial institution's servers, wherein the request comprises an authorization for aggregating account data of the user;

electronically scraping account data of the user, by the outsource provider server, from a website user interface of a first financial institution's servers, the account data being in a human-displayable format, rebuilding the account data into a computer-readable standard data exchange API format, and storing the rebuilt account data in a computer memory of the outsource provider server as aggregated account data;

detecting, by the outsource provider server, recurring payments from the aggregated account data of the user, wherein the recurring payments comprise both the automatic payments currently being made by the first financial institution and other payments that are not currently being made as automatic payments by the first financial institution;

electronically scraping, by the outsource provider server, payment information from the aggregated account data for each of the recurring payments and storing the payment information in the computer memory of the outsource provider server;

electronically scraping, by the outsource provider server, payee information from the aggregated account data for each of the recurring payments and storing the payee information in the computer memory of the outsource provider server;

retrieving, by the outsource provider server, one or more electronic automatic payment forms directly from the second financial institution's servers;

automatically populating, by the outsource provider server, the one or more retrieved electronic automatic payment forms with the payee and payment information stored in the computer memory of the outsource provider server for each of the recurring payments and storing the one or more populated electronic automatic payment forms in the computer memory of the outsource provider server;

sending, by the outsource provider server, the one or more populated electronic automatic payment forms directly back to the second financial institution's servers over the computer network, thereby creating for the user a new automatic payment for each of the recurring payments at the second financial institution's servers; and sending, by the outsource provider server, instructions directly to the first financial institution's server to cancel the automatic payments currently being made by the first financial institution.

2. The method of claim 1, wherein the computer-readable standard data exchange API format is an MX Data Exchange (MDX) API format.

3. The method of claim 1, wherein the computer-readable standard data exchange API format is an Open Financial Exchange (OFX) API format.

4. The method of claim 1, wherein the computer-readable standard data exchange API format is a Credit Union Financial Exchange (CUFX) API format.

5. The method of claim 1, wherein the automatic payments are bill payments.

6. The method of claim 5, wherein the website user interface is a bill-pay website user interface of the first financial institution's servers.

7. The method of claim 1, wherein the current automatic electronic financial services further comprise direct deposit.

8. The method of claim 1, wherein the recurring payments are detected using pattern recognition.

9. The method of claim 1, wherein the recurring payments are detected using string matching.

10. The method of claim 1, wherein the recurring payments are detected using data tags.

11. The method of claim 1, wherein the recurring payments are detected using meta data.

12. A third-party outsource provider server, comprising:

a memory;

one or more processors coupled to the memory and configured to:

receive a request from a user over a computer network for electronically migrating current automatic electronic financial services comprising automatic payments from a first financial institution's servers to a second financial institution's servers, wherein the request comprises an authorization for aggregating account data of the user;

electronically scrape account data of the user from a website user interface of a first financial institution's servers, the account data being in a human-displayable format, rebuild the account data into a computer-readable standard data exchange API format, and store the rebuilt account data in the memory as aggregated account data;

detect recurring payments from the aggregated account data of the user, wherein the recurring payments comprise both the automatic payments currently being made by the first financial institution and recurring payments that are not currently being made as automatic payments by the first financial institution;

electronically scrape payment information from the aggregated account data for each of the recurring payments and store the payment information in the memory;

electronically scrape payee information from the aggregated account data for each of the recurring payments and store the payee information in the memory;

retrieve one or more electronic automatic payment forms directly from the second financial institution's servers;

automatically populate the one or more retrieved electronic automatic payment forms with the payee and payment information stored in the memory for each of the recurring payments and store the one or more populated electronic automatic payment forms in the memory;

send the one or more populated electronic automatic payment forms directly back to the second financial institution's servers over the computer network, such that a new automatic payment for each of the recurring payments is set-up for the user at the second financial institution's servers; and send instructions directly to the first financial institution's server to cancel the automatic payments currently being made by the first financial institution.

13. The third-party outsource provider server of claim 12, wherein the computer-readable standard data exchange API format is an MX Data Exchange (MDX) API format.

14. The third-party outsource provider server of claim 12, wherein the computer-readable standard data exchange API format is an Open Financial Exchange (OFX) API format.

15. The third-party outsource provider server of claim 12, wherein the computer-readable standard data exchange API format is a Credit Union Financial Exchange (CUFX) API format.

16. The third-party outsource provider server of claim 12, wherein the automatic payments are bill payments.

17. The third-party outsource provider server of claim 16, wherein the website user interface is a bill-pay website user interface of the first financial institution's servers.

18. The third-party outsource provider server of claim 12, wherein the current automatic electronic financial services further comprise direct deposit.

19. The third-party outsource provider server of claim 12, wherein the recurring payments are detected using pattern recognition.

20. The third-party outsource provider server of claim 12, wherein the recurring payments are detected using string matching.

21. The third-party outsource provider server of claim 12, wherein the recurring payments are detected using data tags.

22. The third-party outsource provider server of claim 12, wherein the recurring payments are detected using meta data.

* * * * *